(12) United States Patent
M'Raihi et al.

(10) Patent No.: US 9,185,108 B2
(45) Date of Patent: Nov. 10, 2015

(54) TOKEN SHARING SYSTEM AND METHOD

(75) Inventors: David M'Raihi, San Carlos, CA (US); Siddharth Bajaj, San Francisco, CA (US); Nicolas Popp, Menlo Park, CA (US)

(73) Assignee: Symantec Corporation, Mountain View, CA (US)

( * ) Notice: Subject to any disclaimer, the term of this patent is extended or adjusted under 35 U.S.C. 154(b) by 1959 days.

(21) Appl. No.: 11/418,227

(22) Filed: May 5, 2006

(65) Prior Publication Data

US 2007/0016943 A1 Jan. 18, 2007

Related U.S. Application Data

(60) Provisional application No. 60/678,214, filed on May 6, 2005.

(51) Int. Cl.
| H04L 9/32 | (2006.01) |
| G06F 21/34 | (2013.01) |
| H04L 29/06 | (2006.01) |
| G06F 21/33 | (2013.01) |

(Continued)

(52) U.S. Cl.
CPC ............ *H04L 63/0838* (2013.01); *G06F 21/33* (2013.01); *G06F 21/34* (2013.01); *G06F 21/40* (2013.01); *G06F 21/44* (2013.01); *G06Q 20/341* (2013.01); *G06Q 20/40* (2013.01); *G06Q 20/4014* (2013.01); *G07C 9/00103* (2013.01); *G07F 7/1008* (2013.01); *H04L 9/0877* (2013.01); *H04L 9/3228* (2013.01); *H04L 9/3234* (2013.01); *H04L 63/0853* (2013.01); *G06F 2221/2115* (2013.01); *G06F 2221/2117* (2013.01); *G06F 2221/2129* (2013.01); *G06F 2221/2153* (2013.01); *H04L 2209/56* (2013.01)

(58) Field of Classification Search
USPC .......... 707/200; 713/153, 155–156, 159, 172, 713/185; 726/5; 380/4, 21, 259, 264, 282, 380/286, 247; 235/380, 441, 451; 705/56, 705/64–67, 71–73, 76
See application file for complete search history.

(56) References Cited

U.S. PATENT DOCUMENTS

| 5,544,322 A | * | 8/1996 | Cheng et al. .................. 709/229 |
| 5,943,423 A | | 8/1999 | Muftic |

(Continued)

FOREIGN PATENT DOCUMENTS

| EP | 1626347 A1 | 2/2006 |
| JP | 200169138 | 3/2001 |

(Continued)

OTHER PUBLICATIONS

Carlos Costa et al., "A New User-Oriented Model to Manage Multiple Digital Credentials," ICEIS 2003, Proceedings of the 5th International Conference on Enterprise Information Systems, Apr. 22-26 2003, Angers, France.

(Continued)

*Primary Examiner* — Gilberto Barron, Jr.
*Assistant Examiner* — Wayne An
(74) *Attorney, Agent, or Firm* — Lowenstein Sandler LLP

(57) ABSTRACT

A scalable system and method for authenticating entities such as consumers to entities with a diverse set of authentication requirements, such as merchants, banks, vendors, other consumers, and so on. An authentication credential such as a token can be shared among several resources as a way to authenticate the credential owner.

8 Claims, 4 Drawing Sheets

(51) Int. Cl.
*G06F 21/40* (2013.01)
*G06F 21/44* (2013.01)
*G06Q 20/34* (2012.01)
*G06Q 20/40* (2012.01)
*G07C 9/00* (2006.01)
*G07F 7/10* (2006.01)
*H04L 9/08* (2006.01)

(56) References Cited

U.S. PATENT DOCUMENTS

| | | | |
|---|---|---|---|
| 6,182,076 B1 * | 1/2001 | Yu et al. | 707/10 |
| 6,263,446 B1 | 7/2001 | Kausik et al. | |
| 6,510,236 B1 * | 1/2003 | Crane et al. | 382/116 |
| 7,058,180 B2 | 6/2006 | Ferchichi et al. | |
| 7,085,840 B2 * | 8/2006 | de Jong et al. | 709/229 |
| 7,349,949 B1 * | 3/2008 | Connor et al. | 709/217 |
| 7,359,982 B1 * | 4/2008 | Connor et al. | 709/232 |
| 7,370,195 B2 * | 5/2008 | Parham et al. | 713/155 |
| 7,412,420 B2 * | 8/2008 | Holdsworth | 705/44 |
| 2002/0198848 A1 * | 12/2002 | Michener | 705/75 |
| 2003/0046551 A1 * | 3/2003 | Brennan | 713/185 |
| 2003/0172090 A1 | 9/2003 | Asunmaa et al. | |
| 2004/0059952 A1 | 3/2004 | Newport et al. | |
| 2005/0033703 A1 | 2/2005 | Holdsworth | |
| 2006/0013393 A1 | 1/2006 | Ferchichi et al. | |
| 2006/0208066 A1 | 9/2006 | Finn et al. | |

FOREIGN PATENT DOCUMENTS

| | | |
|---|---|---|
| WO | 0131840 | 5/2001 |
| WO | 0248846 | 6/2002 |
| WO | 2006121854 A2 | 11/2006 |

OTHER PUBLICATIONS

Jim Basney et al., "Credential Wallets: A Classification of Credential Repositories Highlighting MyProxy" 31st Research Conference on Communication, Information and Internet Policy (TPRC 2003), Sep. 19-21, 2003, Arlington, Virginia.
Diversinet, "Diversinet Introduces Two-Factor Authentication Multi-Token Wallet for Symbian OS Phones," available at http://www.diversinet.com/press/2005/PR101105(TokenWallet).htm, Oct. 11, 2005 (last visited Oct. 2, 2006).
Ernesto Damiani et al., "Managing Multiple and Dependable Identities," IEEE Internet Computing, Nov./Dec. 2003, pp. 2-10, IEEE Computer Society.
Molva et al., "Authentication Method with Impersonal Token Cards", IEEE, 1993, pp. 56-65.
Harper et al., "A Security Policy Based upon Hardware Encryption", IEEE, 2004, pp. 1-8.
Written Opinion for PCT/US2006/017404 mailed Nov. 23, 2007.
International Search Report for PCT/US2006/017404 mailed Nov. 23, 2007.
International Preliminary Report on Patentability for PCT/US2006/017404 mailed Dec. 11, 2007.
Extended European Search Report for Application No. 06759151.1, dtd Dec. 14, 2012.
US 5,373,559, 12/1994, Kaufman et al. (withdrawn)

* cited by examiner

TOKEN SHARING SYSTEM AND METHOD

CROSS-REFERENCE TO RELATED APPLICATION

This application claims the benefit of provisional application Ser. No. 60/678,214 filed May 6, 2005, the disclosure of which is hereby incorporated in its entirety by reference herein.

FIELD OF THE INVENTION

The field of the invention is computer security, in particular authentication.

BACKGROUND OF THE INVENTION

Enterprises are known to employ strong authentication techniques to protect the confidentiality, integrity and assured service of their data and information technology. This has been accomplished using a variety of methods, including issuing a digital certificate to each employee, providing a token to each employee, etc. Strong authentication for an enterprise can be relatively straightforward to implement because there is generally a single entity to which a controlled group of users must authenticate themselves, i.e., the enterprise itself.

It can be difficult to apply strong authentication techniques for consumer applications. Digital certificates and tokens can be perceived as an encumbrance to the consumer's interaction with other entities, such as merchants, and can be an expense that neither the consumer nor the other entity is willing to bear. However, the consumer's willingness to adopt certain strong authentication techniques can be expected to grow in view of the increasingly sophisticated and damaging threat posed by hackers, such as identity theft, phishing, man-in-the-middle attacks and credit card theft. This is further accentuated by the increasing amount of commerce and other activities that take place online each year.

Indeed, the unanswered threat of compromise and the resultant accumulation of negative events can itself be considered a modern impediment to the continued migration of consumer activities to an online environment. Although stronger authentication is needed for the consumer, certain known solutions can be difficult to implement. For example, unlike most enterprise clients, a consumer must authenticate itself to a broad range of diverse entities. A consumer typically may not want to keep track of a different authentication credentials that are associated with different entities. For example, many consumers have multiple bank, credit card, service provider, healthcare and government accounts. Each of these could benefit from strong authentication by the consumer. In this case, if the consumer is issued one authentication device per account, he or she may potentially have a pocket or key ring full of devices. This may be undesirable to the consumer.

What is needed is an authentication system and method that can operate using a shared token that can be used by the consumer to authenticate himself to a wide variety of enterprises. If a single token can be shared across many sites, then it is much more likely that the consumer will begin to carry it around as a necessary personal tool much like a cell phone, car keys or credit cards.

DETAILED DESCRIPTION

As used herein, "identity sharing" means sharing the ability to authenticate the personal identity of the holder of a token. "Second factor sharing" means sharing the ability to authenticate an alias associated with a token. For example, a two-factor authentication system can include a Personal Identification Number ("PIN," the "first factor") and a One-Time Password ("OTP," the "second factor.") The PIN is a secret shared between the individual holder of the token and the authentication system. A particular OTP can be one in a sequence of numbers that can be uniquely generated only by a given token and be checked by the authentication system. When an authentication system receives and verifies a PIN from a user, the system can authenticate the user as being that user who is correlated with that particular PIN. Likewise, when an authentication system receives and verifies an OTP from a token, it can authenticate the token as being that token that is correlated with that particular OTP. In an identity sharing system, any of several entities can authenticate the identity of the user based upon, for example, the PIN or the PIN and the OTP. In a second factor sharing system, the any of several entities can authenticate the token itself using the OTP. Although identity and second factor sharing has been discussed using a two-factor authentication device as an example, any authentication scheme can be used in accordance with the present invention. For example, digital certificates and/or challenge-response schemes can be used for second factor sharing.

Centralized Token Service Model

In accordance with an embodiment of the present invention, a centralized token service infrastructure is employed to provision and validate the second factor credential, such as a certificate or an OTP, e.g., stored on and/or implemented by a hardware token. The token implementing the second factor can be activated at any of a variety of applications and/or web-sites. An application can manage the first factor, such as a username and password, in the application's own user database. As part of token activation, the application can store a mapping between the local username and a shared second factor token identifier, such as a token serial number.

For validation, the user can enter a first factor, such as a username and password, and a second factor, such as a OTP from the token or a certificate stored on the token. The application can validate the first factor locally. Upon successful validation, it can retrieve the token serial number that can be associated with the first factor and then validate the second factor by sending a validation request to a centralized validation service, e.g., over a network such as the Internet, a Virtual Private Network, etc. To accomplish this, an enterprise hosting the application can deploy a validation proxy (the "Authentication Agent,") to the centralized validation service.

Figure 1:
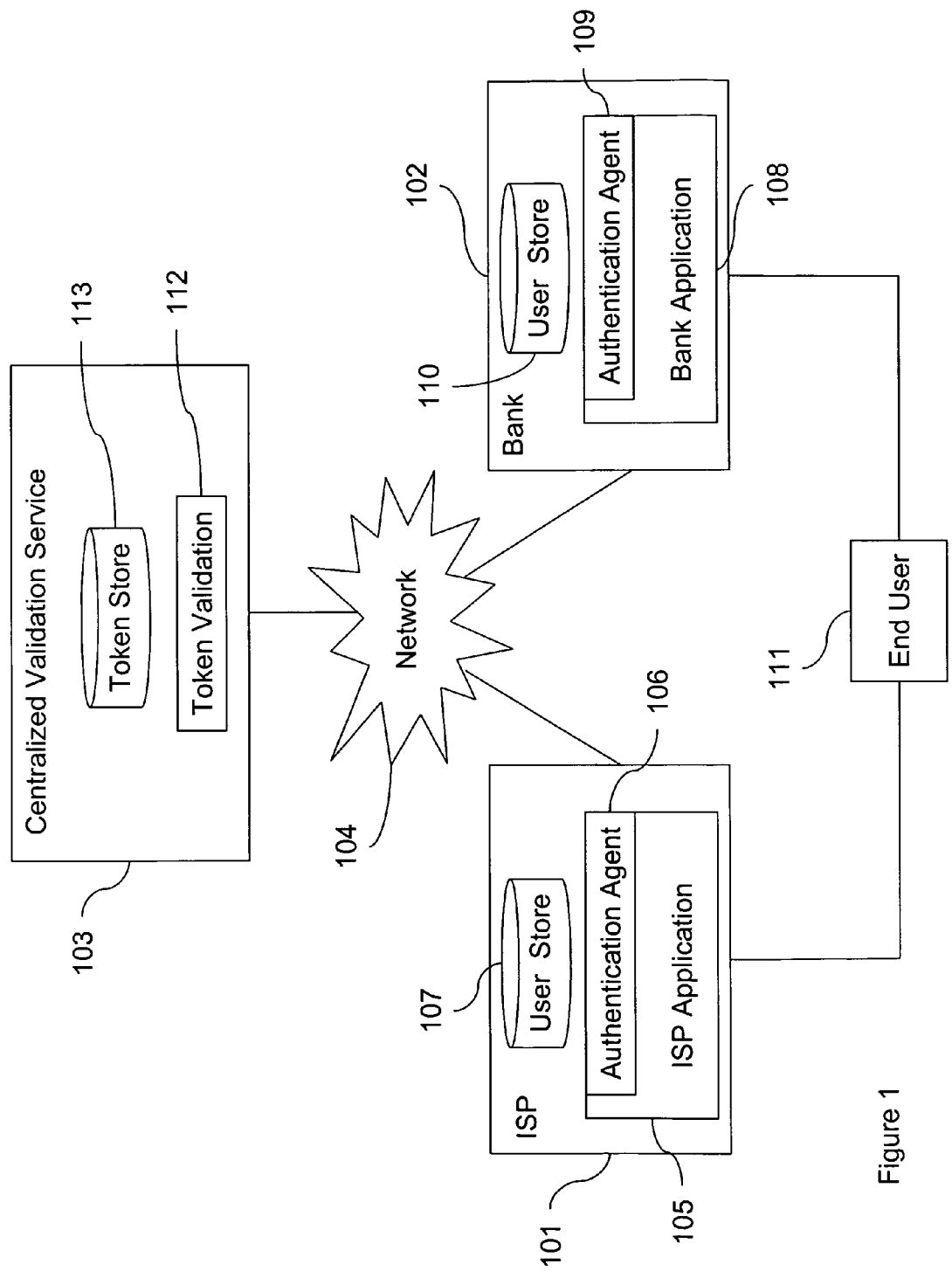
FIG. 1 shows a centralized validation service in accordance with an embodiment of the present invention.

FIG. 1 shows a centralized validation service in accordance with an embodiment of the present invention. Internet Service Provider ("ISP") 101 and bank 102 are coupled to Centralized Validation Service 103 through network 104. ISP 101 includes ISP application 105, ISP authentication agent 106 and ISP user store 107. ISP user store can be a database that correlates a first factor with the identity of a user (such as the identity of an ISP customer, administrator, employee, etc.) for one or more first factors and user identities. Bank 102 can include banking application 108, bank authentication agent 109 and bank user store 110. Bank user store 110 can be a database that correlates a first factor with the identity of a user (such as a bank account holder, a bank officer, a bank IT administrator, a bank employee, etc.) End user 111 can activate a shared token, where the token is shared in this example between ISP 101 and bank 102. To authenticate himself to the ISP 101, end user 111 can enter his ISP username, which in this case is his e-mail address, e.g., joe@isp.com. End user 111 can also enter his associated password (e.g., "rolf362") and an OTP from his token. ISP validates the username and password provided by end user 111 by consulting ISP user store 107. An example of a record in user store 107 includes a username, a user password and a device identifier. For example, (joe@isp.com, "rolf362", 27582343). ISP 101 can send to Central Validation Service 103 a request that includes the OTP received from end user 111 and the token identifier retrieved from the user store. Centralized Validation Service 103 can include token validation application 112 and token store 113. Token store 113 can be a database that correlates token identifiers with precalculated OTPs and/or one or more secrets stored in the token associated with the token identifier and/or other information needed to verify a OTP from a token. Validation application 112 can compare the received OTP with one or more OTPs obtained from token store 113 and/or can calculate a OTP for comparison with the received OTP based upon data obtained from token store 113. Centralized Validation Service 103 can send a response message to ISP 101 indicating that the OTP has or has not been successfully validated. ISP 101 can provide Internet services to end user 111 if both the username/password and the OTP from end user 111 are successfully validated.

Similarly, end user 111 can provide a username (e.g., jsmith@bank.com) and a password to bank 102, which can validate these using bank user store 110. Bank 102 can send an OTP and token identifier received from end user 111 to Centralized Validation Service 103, which can validate these and send a response message to bank 102. If both the username and password and OTP are successfully validated, bank 102 can provide to end user 111 access to end user 111 account information and banking services.

In this example, end user 111 can initially obtain the token either from ISP 101, bank 102 or Centralized Validation Service 103. Each application can pay a centralized validation service and a token issuer for providing authentication services and products to the parties to a transaction.

Distributed Validation System

Figure 2:
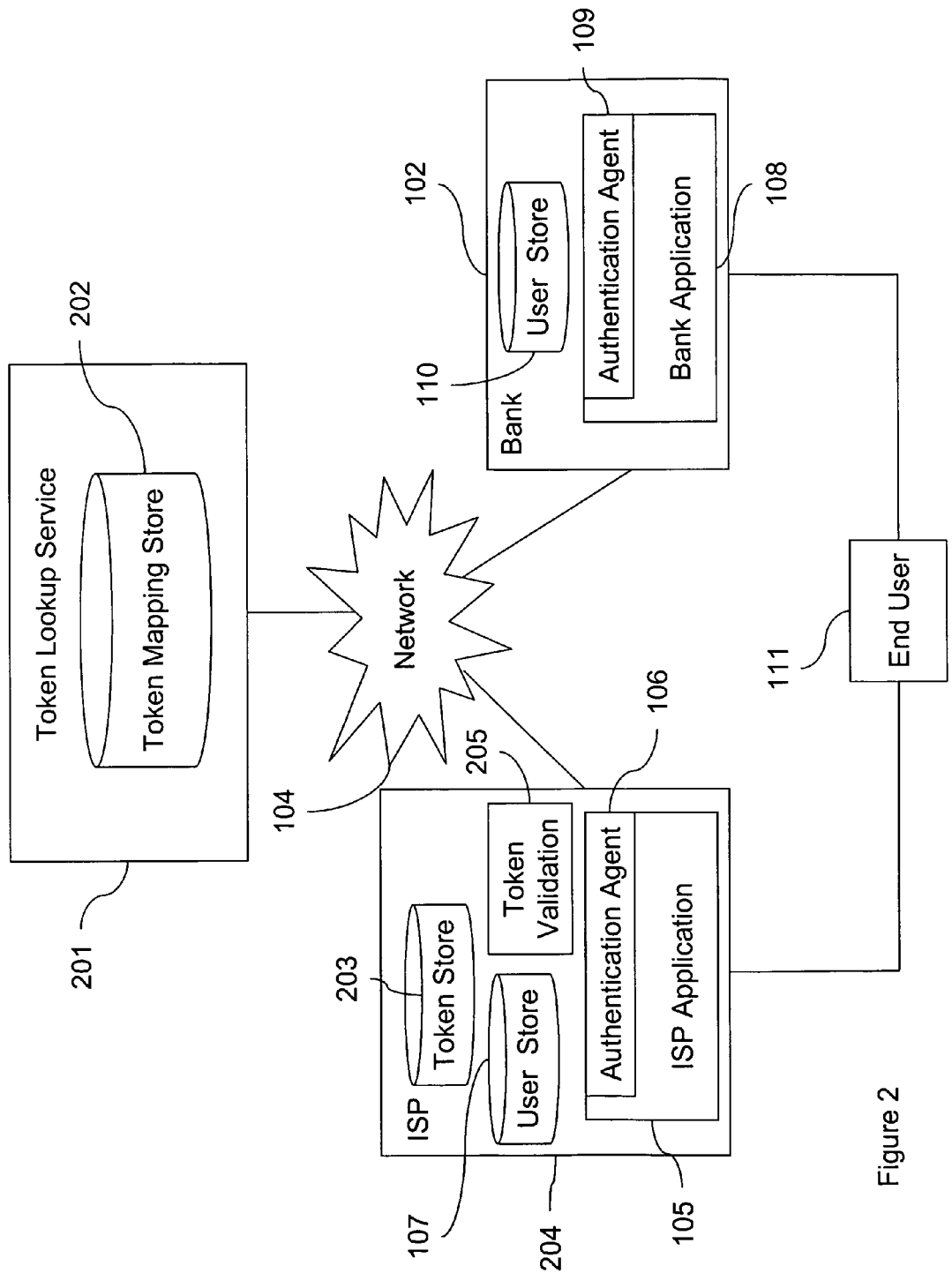
FIG. 2 shows a distributed validation service in accordance with an embodiment of the present invention

In accordance with another embodiment of the present invention, a distributed architecture is employed to validate the second factor. FIG. 2 shows an embodiment of the distributed validation architecture. ISP 204 and bank 102 are coupled to Token Lookup Service 201 through a network 104, such as the Internet. ISP 204 can include token store 203, which can be a database that correlates token identifiers with precalculated OTPs and/or one or more secrets stored in the token associated with the token identifier and/or other information needed to verify a OTP from a token. This can be implemented at a one time password validation server 205 at ISP 204.

Token Lookup Service 201 can include Token Mapping Store 202. Token Mapping Store 202 can be a database that includes records that correlate token serial numbers with the network address (e.g., the IP address) of a validation server 205 that can validate the second factor credential from that token. Such a validation server is the Authoritative Validation Node (AVN) for that token serial number. Several AVNs can comprise a network of distributed validation servers. An example of a record stored at Token Mapping Store can be (IP-Address, Token_Identifier), e.g., (123.21.3.156, 1453422207). In this example, 123.21.3.156 can be the network address of the one time password validation server 205 and 1453422207 can be the identifier of the token whose one time password is to be validated by server 205.

In the example shown in FIG. 1, ISP 101 can act as a token issuer by registering a list or range of token serial numbers with Token Lookup Service 201. The list or range of token serial numbers can be stored in token mapping store 202, which correlates the serial numbers to the IP address of ISP 101. Bank 102 acts as a relying party. When end user 111 requests access to information and services provided by bank 102 (the bank can be a "resource" sought to be accessed by a user of the token), end user 111 provides to bank 102 first and second authentication factors and the serial number for end user 111 token. Bank 102 can validate a first factor (such as username and password) using bank user store 110. This can be implemented using a resource validation server at Bank 102, e.g., a server on which the authentication agent 109 is implemented. It can store the mapping between Joe's username and token serial number in the local user store. It can also cache AVN information for the token locally. Caching may be implemented as it is implemented for DNS caching.

Bank 102 can also send a request to Token Lookup Service 201 that includes the token serial number provided by end user 111. Token mapping store 202 correlates the token serial number to the AVN IP address, which in this example is the IP address of ISP 101. Token lookup service 201 can return the IP address of the AVN (ISP 101) to bank 102. ISP 101 can include token store 203 and token validation application 205. Bank 102 can then send a validation request to ISP 101, which can validate the second factor using token validation application 205 and token store 203. ISP 101 can send the results of the validation to bank 102 in a response message.

In the example shown in FIG. 2, end user 111 can authenticate to his ISP using his username (joe@isp.com), his associated password ("rolf362") and the OTP from his token. Since both the ISP and the bank have implement the distributed validation service, end user 111 can log into his online banking application at bank 102 utilizing his username (jsmith@bank.com), the associated password ("Rolf362") and the OTP from his ISP-issued token.

Token issuers, relying parties and Token Lookup Service 201 can authenticate themselves to each other as necessary. This can permit parties to introduce authorization and billing functionality for second factor validation, enabling a rich set of business models.

Credential Wallet

In accordance with another embodiment of the present invention, a credential wallet model leverages next generation mobile devices such as Java cell phones and PDAs that have storage and application capabilities and some form of graphic interface to manage credentials. In this embodiment, a mobile device can be a 'wallet' that can contain multiple instances of a second factor credential. For each site needing strong authentication, the appropriate credential or credentials can be accessed.

Each site or application can provision, manage and validate its own instance of the second factor credential, such as OTP tokens on the same physical device, thereby obviating the need for users to carry multiple tokens. For example, ISP 301 can include token validation application 303 and token store 203. Likewise, bank 302 can include token store 305 and validation application 304.

Figure 3:
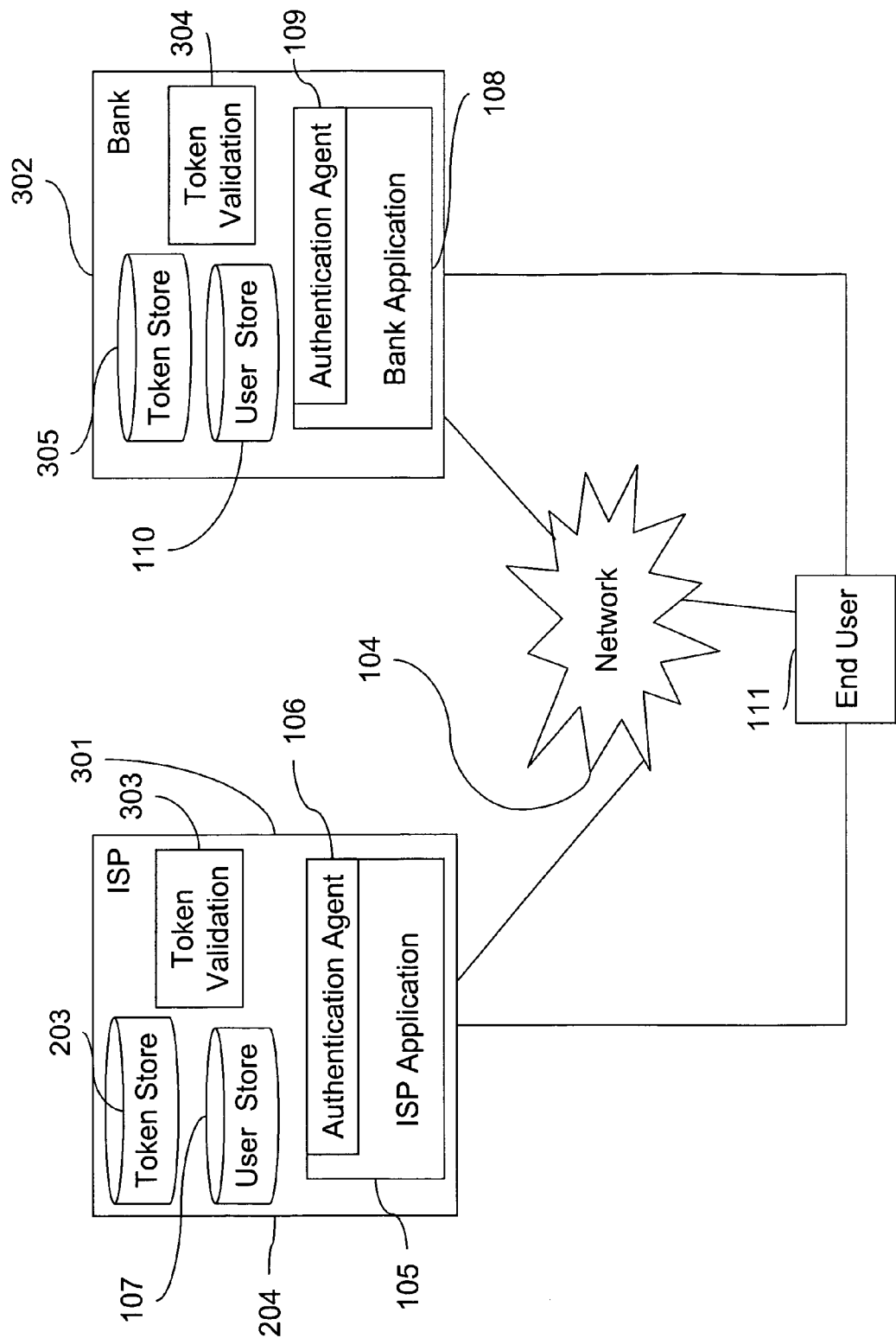
FIG. 3 shows a credential wallet architecture in accordance with an embodiment of the present invention.
Figure 4:
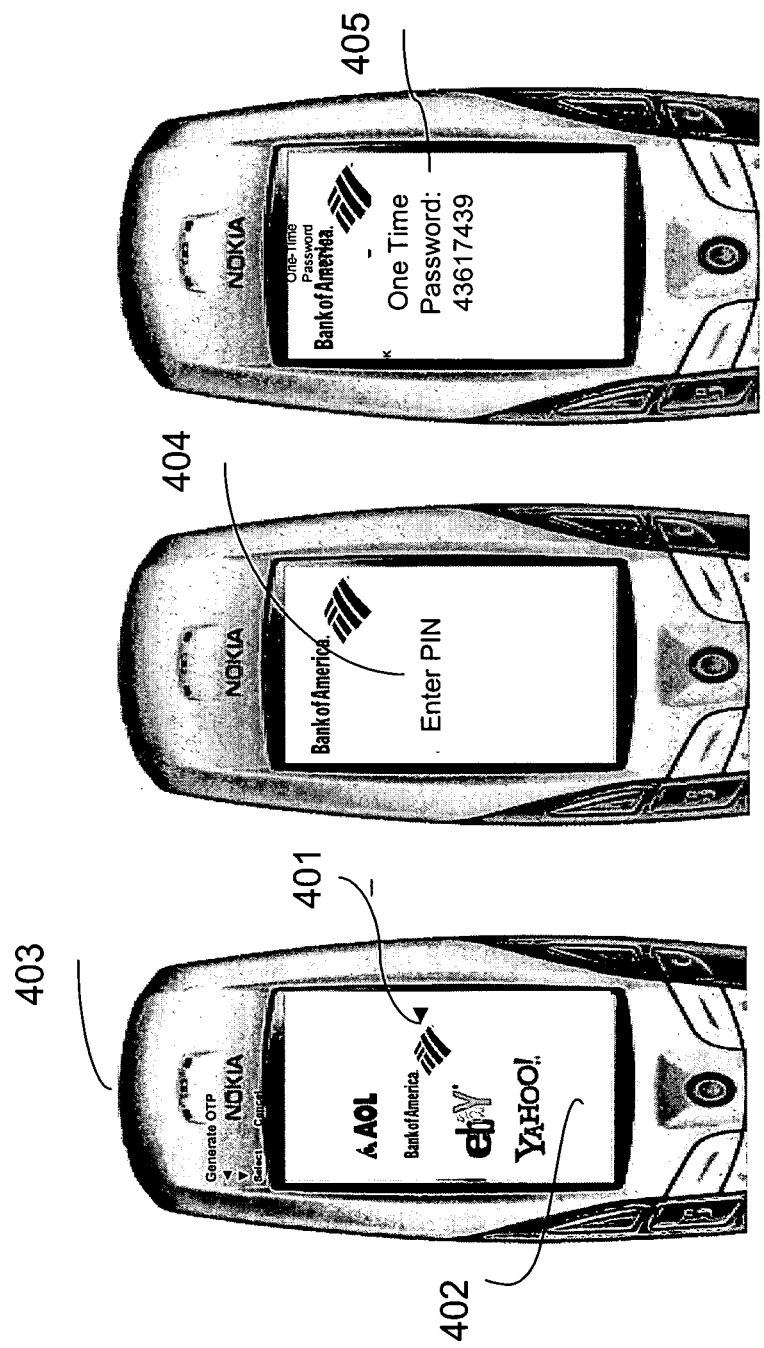
FIG. 4 shows a cell phone implementation of a single device that can generate multiple tokens in accordance with an embodiment of the present invention.

In the example shown in FIG. 3, end user 111 mobile phone (not shown) can have different OTP credentials provisioned for different applications and/or sites. End user 111 can log into ISP 301 by using his ISP username (e.g., joe@isp.com), the associated password ("rol362") and the appropriate OTP value for ISP 301. The second factor for ISP 301 can be validated using ISP validation application 303 and token store 203. End user 111 can obtain the appropriate OTP value for ISP 301 as shown in FIG. 4. End user 111 can scroll a cursor 401 to the appropriate icon shown on the display screen 402 of cell phone 403. End user 111 can be asked to enter a PIN 404, which can be validated by cell phone 403. Upon successful validation of the PIN, the OTP value can be displayed 405 on screen 402.

End user 111 can logon to his online bank account using his username (jsmith@bank.com), associated password ("rolf32") and the OTP value from his bank's OTP token, as generated by his cell phone. The second factor for bank 302 can be validated using bank validation application 304 and token store 305.

In this credential wallet embodiment, each entity can deploy its own first and second factor authentication infrastructure. There is no dependency on an external authentication/validation party because the token itself is not shared. Rather, various tokens "share" a common token-generating device, such as a cell phone with the appropriate software.

Each of the embodiments discussed above can coexist and can be integrated to participate in the same authentication network. Each embodiment can be deployed independently as part of an evolutionary process towards a common end state, which can be a trusted, flexible, economical and easy to use authentication system for consumer applications.

Embodiments of the present invention can associate and authenticate users of various devices and/or credentials across multiple systems using a credential identifier. The credential identifier can be an identifier for the user (such as a name or an email address), or it may be an anonymous identifier (such as a number). The anonymous identifier can be an opaque identifier such as the result of a one-way transform of a set of user identifiers (such as hashing a username and/or a token identifier, credential reference, etc.)

Embodiments of the present invention can support an anonymizer service to generate an opaque identifier from a real identifier. Further, Different credential identifiers can be used for the same user by different relying parties for the same device. A credential can be transmitted in a way that preserves privacy, e.g. by using randomization (pure randomization, random encryption, etc.) or any suitable process to avoid tracking of a user.

The method in accordance with embodiments of the present invention can describe a service for discovering the correct validation node based on the token ID, i.e., a token lookup service. The token lookup service can maintain a list that maps token identifiers to token validation nodes. There may be more than one token identifier for each token. Authorized parties can query the token lookup service to determine the correct validation node for each service. The invention can operate works with multiple devices and multiple authentication algorithms. It can be implemented in software on desktop PCs, software on mobile devices, dedicated hardware or any other suitable platform.

The present invention can use one time password, challenge/response, and PKI (digital certificate) based credentials and authentication algorithms. Anonymous devices and credentials, and devices and credentials containing personal identifiers can be employed.

Embodiments of the invention include a centralized service that enables multiple relying parties to send validation requests for the same authentication device or credential.

Embodiments of the invention can be used for "token wallets." These wallets can contain multiple credentials for different services. Each credential in the wallet could be used by multiple services. A wallet may contain more than one shared credential, unshared credentials and multiple types of credentials, such as OTP credentials, digital certificates, challenge and response credentials, etc. It may contain more than one of each type of credential, or none of any type of credential.

Embodiments of the present invention can include centralized maintenance functions. If a credential is lost, broken, or stolen, then the token can be disabled across all applications in a single operation. If a credential is revoked or misused, an administrator can disable the credential across all or a designated subset of applications. This can be done in a single operation.

The foregoing is meant to illustrate and not limit the scope of the present invention. Other embodiments not explicitly described above are encompassed by the claims, as will be appreciated by those of skill in the art.

What is claimed is:

1. A system comprising:
a first one time password generation device to generate one time passwords, wherein the first one time password generation device corresponds to a first one time password generation device identifier;
a first entity to receive a first one time password generated by the first one time password generation device and to provide a first service to a user of the first one time password generation device in response to successful validation of the first one time password;
a second entity to receive a second one time password generated by the first one time password generation device and to provide a second service to the user of the first one time password generation device in response to successful validation of the second one time password;
a first one time password validation server to receive the first one time password from the first entity, validate the first one time password, and provide results of the validation of the first one time password to the first entity, wherein the first one time password validation server is further to receive the second one time password from the second entity, validate the second one time password, and provide results of the validation of the second one time password to the second entity; and
a one time password generation device lookup server comprising a database to store correlations between a plurality of one time password generation device identifiers and a plurality of network addresses, wherein each of the plurality of network addresses corresponds to one of a plurality of one time password validation servers, wherein the plurality of one time password validation servers is to validate one time passwords generated by a plurality of one time password generation devices that each correspond to one of the plurality of token one time password generation device identifiers, wherein the plurality of one time password validation servers comprises the first one time password validation server having a network address among the plurality of network addresses, wherein the plurality of one time password generation devices comprises the first one time password generation device having a first one time password generation device identifier among the plurality of token one time password generation device identifiers, and wherein the stored correlations comprise a correlation between the network address of the first one time password validation server and the first one time password generation device identifier of the first one time password generation device, wherein the one time password generation device lookup server is to receive the first one time password generation device identifier from the first entity and send the network address of the first one time password validation server to the first entity in view of the first one time password generation device identifier received from the first entity and the stored correlation, wherein the first entity is to send the first one time password to the first one time password validation server in view of the network address of the first one time password validation server received from the one time password generation device lookup server, wherein the one time password generation device lookup server is to receive the first one time password generation device identifier from the second entity and send the network address of the first one time password validation server to the second entity in view of the first one time password generation device identifier received from the second entity and the stored correlation, and wherein the second entity is to send the second one time password to the first one time password validation server in view of the network address of the first one time password validation server received from the one time password generation device lookup server.

2. The system of claim 1, wherein the first entity is further to receive a first authentication factor from the user of the first one time password generation device and to authenticate the first authentication factor, and wherein the first entity is to provide the first service to the user of the first one time password generation device further in view of successful authentication of the first authentication factor.

3. The system of claim 2, wherein the first authentication factor provided by the user of the first one time password generation device comprises a username or a secret shared between the user of the first one time password generation device and the first entity.

4. The system of claim 1, wherein the first entity comprises a second one time password validation server among the plurality of one time password validation servers to validate one time passwords generated by a second one time password generation device among the plurality of one time password generation devices.

5. A system comprising:
a memory to store correlations between a plurality of one time password generation device identifiers and a plurality of network addresses, wherein each of the plurality of network addresses corresponds to one of a plurality of one time password validation servers, wherein the plurality of one time password validation servers is to validate one time passwords generated by a plurality of one time password generation devices that each correspond to one of the plurality of one time password generation device identifiers, wherein the plurality of one time password validation servers comprises a first one time password validation server having a network address among the plurality of network addresses, wherein the plurality of one time password generation devices comprises a first one time password generation device having a first one time password generation device identifier among the plurality of one time password generation device identifiers, and wherein the stored correlations comprise a correlation between the network address of the first one time password validation server and the first one time password generation device identifier of the first one time password generation device; and
a processor to communicate with the memory to:
receive the first one time password generation device identifier from a first entity;
send the network address of the first one time password validation server to the first entity in view of the first one time password generation device identifier received from the first entity and the stored correlation, wherein the first entity is to receive a first one time password generated by the first one time password generation device, send the first one time password to the first one time password validation server in view of the received network address of the first one time password validation server, and provide access to a first service in view of successful authentication of the first one time password by the first one time password validation server;
receive the first one time password generation device identifier from a second entity; and
send the network address of the first one time password validation server to the second entity in view of the first one time password generation device identifier received from the second entity and the stored correlation, wherein the second entity is to receive a second one time password generated by the first one time password generation device, send the second one time password to the first one time password validation server in view of the received network address of the first one time password validation server, and provide access to a second service in view of successful authentication of the second one time password by the first one time password validation server.

6. The system of claim 5, wherein the first entity comprises a second one time password validation server among the plurality of one time password validation servers to validate one time passwords generated by a second one time password generation device among the plurality of one time password generation devices.

7. A method comprising:
storing in a database correlations between a plurality of one time password generation device identifiers and a plurality of network addresses, wherein each of the plurality of network addresses corresponds to one of a plurality of one time password validation servers, wherein the plurality of one time password validation servers is to validate one time passwords generated by a plurality of one time password generation devices that each correspond to one of the plurality of one time password generation device identifiers, wherein the plurality of one time password validation servers comprises a first one time password validation server having a network address among the plurality of network addresses, wherein the plurality of one time password generation devices comprises a first one time password generation device having a first one time password generation device identifier among the plurality of one time password generation device identifiers, and wherein the stored correlations comprise a correlation between the network address of the first one time password validation server and the first one time password generation device identifier of the first one time password generation device;
receiving the first one time password generation device identifier from a first entity;
sending, by a processor, the network address of the first one time password validation server to the first entity in view of the first one time password generation device identifier received from the first entity and the stored correlation, wherein the first entity is to receive a first one time password generated by the first one time password generation device, send the first one time password to the first one time password validation server in view of the received network address of the first one time password validation server, and provide access to a first service in view of successful authentication of the first one time password by the first one time password validation server;

receiving the first one time password generation device identifier from a second entity; and sending, by the processor, the network address of the first one time password validation server to the second entity in view of the first one time password generation device identifier received from the second entity and the stored correlation, wherein the second entity is to receive a second one time password generated by the first one time password generation device, send the second one time password to the first one time password validation server in view of the received network address of the first one time password validation server, and provide access to a second service in view of successful authentication of the second one time password by the first one time password validation server.

8. The method of claim 7, wherein the first entity comprises a second one time password validation server among the plurality of one time password validation servers to validate one time passwords generated by a second one time password generation device among the plurality of one time password generation devices.

* * * * *